United States Patent [19]

Hutchinson et al.

[11] 4,368,609
[45] Jan. 18, 1983

[54] HEIGHT ADJUSTMENT AND SAFETY STOP FOR A HARVESTER REEL

[75] Inventors: Eugene B. Hutchinson, East Moline; Donald L. Dailey, Coal Valley, both of Ill.

[73] Assignee: Deere & Company, Moline, Ill.

[21] Appl. No.: 236,396

[22] Filed: Feb. 20, 1981

[51] Int. Cl.³ .............................................. A01D 57/04
[52] U.S. Cl. ................................ 56/221; 56/DIG. 11; 56/208; 56/222; 92/114
[58] Field of Search ................... 56/DIG. 3, DIG. 10, 56/DIG. 11, DIG. 14, 208, 209, 214, 228, 220, 221, 222; 81/57.24, 57.4; 92/114, 113, 225

[56] References Cited

U.S. PATENT DOCUMENTS

| | | | |
|---|---|---|---|
| 2,873,567 | 2/1959 | Vogelaar et al. | 56/221 |
| 3,080,852 | 3/1963 | Geyer | 92/114 |
| 3,815,480 | 6/1974 | Spyra | 92/13.51 |
| 3,945,180 | 3/1976 | Sinclair | 56/221 |
| 4,077,608 | 3/1978 | Nehrig | 254/93 H |
| 4,167,891 | 9/1979 | Kamimura | 91/408 |
| 4,240,334 | 12/1980 | Crosser | 92/114 |

OTHER PUBLICATIONS

John Deere 200 Series Cutting Platforms Operator's Manual, OM-H101511, Issue I8, pp. 9 and 13.
International Harvester—International 810 Grain Header, Operator's Manual, 1 012 986 R1. 2-74, pp. 8 and 9.

Primary Examiner—Gene Mancene
Assistant Examiner—David L. Tarnoff

[57] ABSTRACT

In a combine harvester header, a modified hydraulic cylinder for controlling reel height includes a cylinder rod sub-assembly having a threaded portion permitting rotation of the cylinder rod to make adjustment of the cylinder rod effective length for fine or supplementary adjustment of the harvester reel relative to the platform cutterbar. A dual purpose member, pivotably captive on a rotatable nut portion of the cylinder rod sub-assembly, is swingable between an approximately horizontal position in which it serves as a wrench handle for rotatably adjusting the cylinder rod threaded portion and, downwards, into a safety stop position where it is engageable with the end of the body of the hydraulic cylinder to prevent inadvertent lowering of the reel from a fully raised position.

9 Claims, 5 Drawing Figures

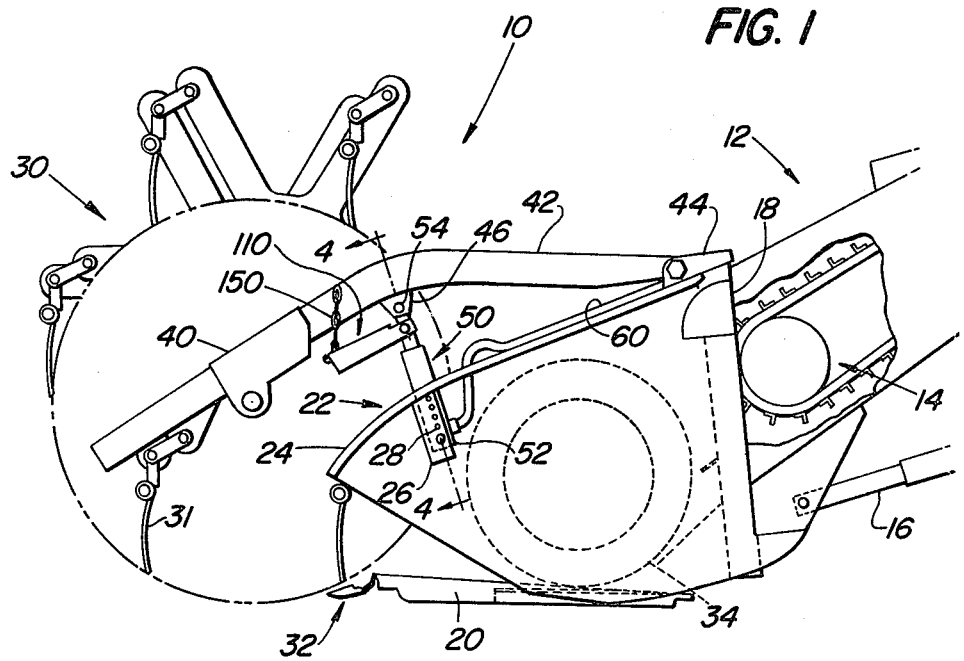

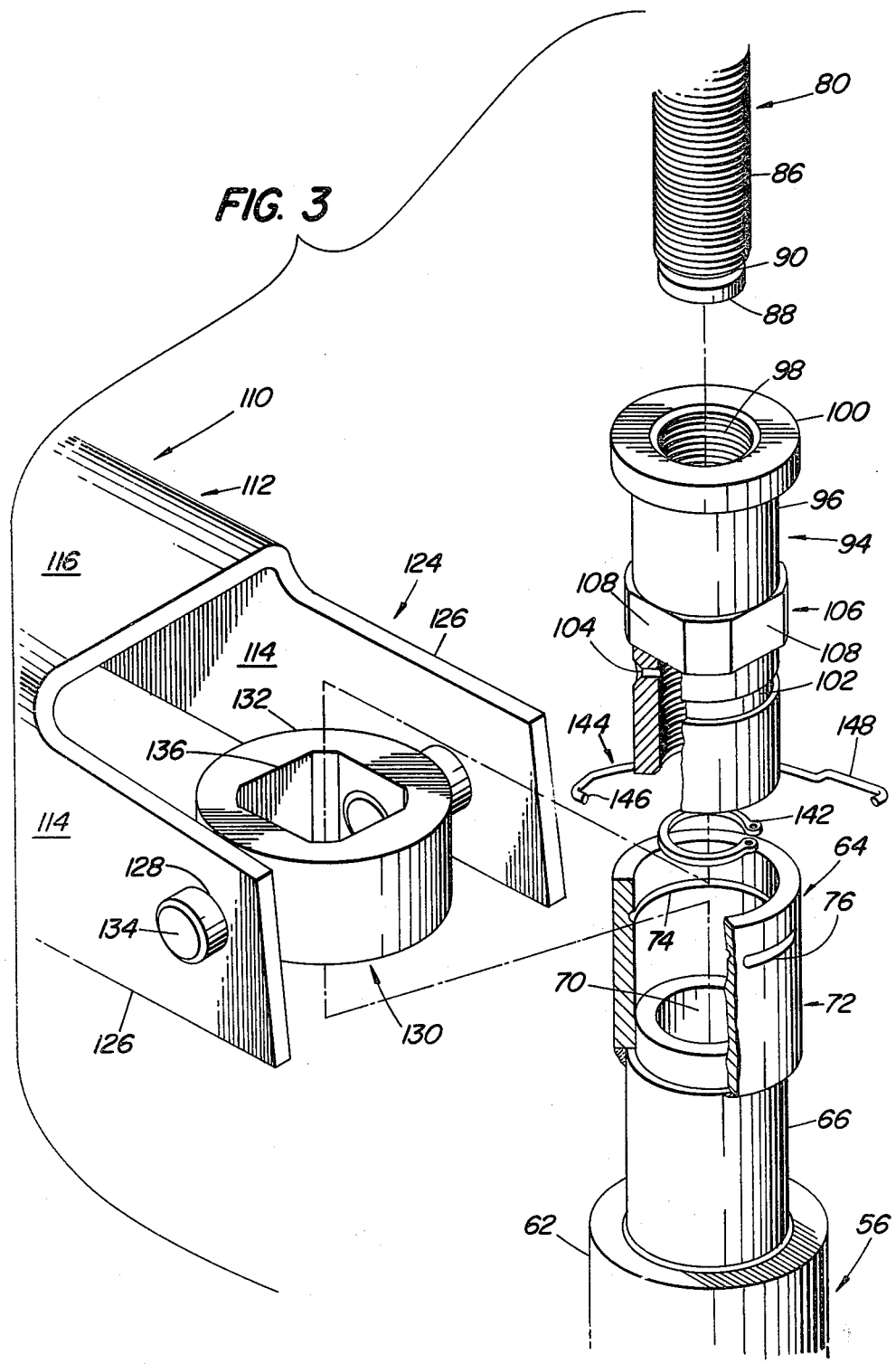

HEIGHT ADJUSTMENT AND SAFETY STOP FOR A HARVESTER REEL

BACKGROUND OF THE INVENTION

This invention is concerned with mobile agricultural machines and more particularly with adjustable disposition or spacing of one functional component with respect to another in such machines as, for example, in the control of reel height with respect to cutterbar in a gathering unit of a harvester. The harvester reel application will be used as an example in the following discussion.

Typically, linear actuators such as hydraulic cylinders, are used to make on-the-go adjustment of position of a functional or material handling component such as the harvester reel. Range of adjustment is limited by the hydraulic cylinder stroke but relative disposition of this range can be selectively adjusted or shifted if, for example, a series of spaced cylinder attaching points are provided for one or both ends of the cylinder, thus providing a coarse stepped adjustment of operating range. In many applications, variables such as crop and operating conditions, deflection of functional components, or manufacturing variations make it desirable to provide means for supplementary fine adjustment. For example, sometimes it is desirable to set a harvester reel to clear a cutterbar by no more than one inch, maintaining that clearance uniformly along the length of the cutterbar. Typically, the reel is supported by reel arms, one at each end of the reel, each end controlled by a single hydraulic cylinder. Supplementary or fine adjustment can provide a range of settings within or overlapping the coarse steps provided by spaced cylinder mounting holes and also the possibility for independent differential adjustment of each end of the reel to maintain it parallel to the cutterbar. It is known to provide such fine adjustment by interposing a pivot bracket with threaded screw adjustment at the attachment of the hydraulic cylinder to the reel arm. More generally, of course, it is also known to provide means for cylinder rod effective length adjustment as part of the attachment of a connecting member such as a clevis or eye-end to the rod of a hydraulic cylinder.

Again, using the harvester reel as an example, it is typical to provide another function associated with the reel lift means—a safety device to prevent inadvertent lowering of the reel. Typically, with the reel raised and hydraulic cylinders extended, a channel-shaped strut or stop arm is pivotably carried on the pin connecting the hydraulic cylinder rod to the reel arm and swung down into position over the cylinder rod when needed. The length of the stop or strut is such that after only a small retraction of the cylinder and lowering movement of the reel, the stop engages the hydraulic cylinder body to prevent further retraction and lowering of the reel.

Disadvantages of the known methods of providing fine or supplementary adjustment of reel height include, for the pivoting bracket type referred to above, clumsy appearance and the potential cost penalty of requiring stress-concentrating holes at a highly stressed portion of the reel arm; and, in the case of the conventional adjustable-length hydraulic cylinder rod, the need to disconnect the rod from the reel arm to permit adjustment.

SUMMARY OF THE INVENTION

Accordingly, it is an object of the invention to provide a simple, compact and convenient means for fine or supplementary adjustment of the effective adjustment-range disposition of one functional component of a mobile machine relative to another part of the same machine, such as in the height adjustment of the reel of a harvesting machine.

Another object of the invention is to combine advantageously the components providing the particular functions of adjustment and safety stop. Features of an embodiment of a reel adjustment and safety stop device, according to the invention, are clean uncluttered appearance resulting, at least in part, from the adjustment mechanism being contained within a linear actuator assembly such as in the cylinder rod assembly of a hydraulic cylinder, but providing cylinder rod length adjustment without the need for disconnecting the rod assembly from the reel arm. In addition, the safety stop may be pivotably and swingably carried by the cylinder rod assembly in such a way that its stopping function (stopped height) always corresponds to full cylinder extension, whatever the cylinder rod length adjustment setting may be.

An important feature of an arrangement of juxtaposed stop and adjusting mechanisms, according to the invention, is that the stop member may be carried by the hydraulic cylinder rod assembly in such a way that it may be used as a wrench for rotating a portion of the cylinder rod assembly to change its effective length. Thus, fine adjustment of reel position may be made without disconnecting or incapacitating any portion of the mechanism and without the need for bringing in an additional tool such as a wrench. It is a feature that operation of the mechanism does not require the removal or disassembly and risk of misplacing of any parts.

Another feature of a mechanism according to the invention, is that the safety stop, used as a wrench, may be so retained by a portion of the hydraulic cylinder rod assembly that it is shiftable (preferably axially) and selectively engageable with a rotatable portion of the rod assembly for rotating that portion to effect adjustment of the length of the cylinder rod assembly. Thus, in adjusting operation, a "ratchet" type movement of the rotatable hydraulic cylinder rod portion, convenient for the operator and not requiring full 360 degree swinging clearance for the combined wrench stop member, may be used.

In keeping with the invention, the adjustable length cylinder rod assembly mechanism may include means for maintaining a selected minimum overlapping or telescoping engagement of an axially adjustable part so as to prevent inadvertent uncoupling of the two parts.

BRIEF DESCRIPTION OF THE DRAWINGS

FIG. 1 is a semi-schematic side elevation of the forward portion of a harvester header with a reel height control system embodying the invention.

FIG. 2 is an enlarged view of the cylinder rod assembly of a hydraulic cylinder of the height control system taken approximately on line 2—2 of FIG. 4, but with the attached combination wrench-handle/stop-arm swung into wrenching position.

FIG. 3 is an enlarged exploded partial perspective view showing particularly one of the cylinder rod assemblies and the mating swivel portion of the combination wrench-handle/stop-arm.

DESCRIPTION OF THE PREFERRED EMBODIMENT

Figure 4:
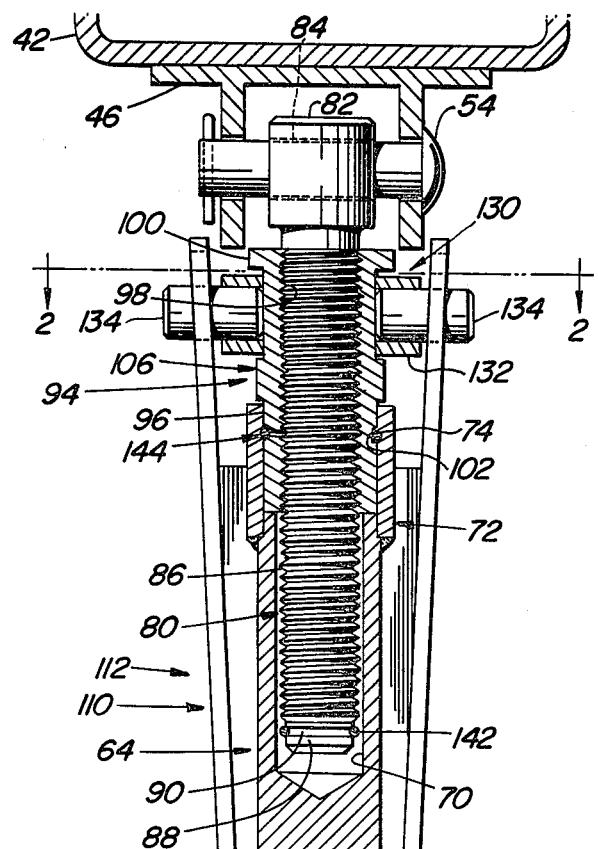
FIG. 4 is an enlarged cross-sectional view taken approximately on line 4—4 of FIG. 1 showing particularly the hydraulic cylinder rod assembly with the hydraulic cylinder fully extended and the stop arm swung down and engaging the end of the cylinder body.

The invention is embodied in an otherwise conventional header for a combine harvester as shown partially in left-hand side elevation in FIG. 1.

The header shown includes a regular cutting platform 10 rigidly connected to a feeding unit or feeder house 12 which is pivotably connected (connection not shown) to the combine body and includes a feeder conveyor 14 for transferring crop material from the platform 10 to the threshing cylinder of the combine. The height of the cutting platform 10 above the ground in operation and transport is controlled by a pair of laterally spaced lift cylinders 16. The principal frame or support structure of the platform includes a rear wall assembly 18, a floor 20 and a pair of opposite end sheets 22 having forward divider portions 24. Each end sheet 22 carries a reel lift cylinder support bracket 26, each bracket having a series of spaced apart pivot holes 28.

A pick-up reel assembly 30 with downward reaching tines 31 controls the movement of crop material relative to a cutter bar 32 and helps guide it into engagement with a platform auger 34 which converges the crop material laterally over the rearward portion of the floor 20 to the center of the platform 10 for delivery to the feeder conveyor 14. The reel assembly 30 is supported at its respective opposite ends by a pair of support brackets 40, each adjustably carried by a reel arm 42, which is pivotably connected at its rearward end to one of a pair of reel arm pivot brackets 44 carried by the platform rear wall structure 18. Each reel arm 42 carries, approximately centrally on its lower side, a reel lift cylinder pivot bracket 46.

At each end of the platform 10, a single acting variable reel lift hydraulic cylinder assembly 50 is pivotably connected between one of the holes 28 in the bracket 26 of the end sheet 22 (secured by lower lift cylinder pin 52) and the reel arm cylinder pivot bracket 46 (secured by upper cylinder pin 54). In reel lift systems, a master and slave cylinder combination is generally used, but the general form of particular features of cylinder structure related to the invention would be common for both master and slave. It is assumed here that a pair of cylinders of the simple (slave) type is used. It will become apparent that the invention is adaptable to any linear hydraulic actuator, single or double acting, used alone or in combination with other cylinders. As indicated in FIGS. 3 and 4, each reel lift cylinder body 56 is generally conventional and defines a cylinder chamber 58 connected to a hydraulic power source on the combine (not shown) by a hydraulic hose assembly 60. The rod end 62 of each cylinder body 56 provides conventional support for the cylinder rod assembly 64 which includes an elongated generally cylindrical rod 66 carrying, at its inner end, a piston 68. The outer or free end of the rod 66 is distinguished by a deep central bore 70 and, attached rigidly to it, a concentrically mounted cylindrical sleeve 72. Close to the free end of the sleeve 72, an internal annular groove 74 is interrupted by a circumferentially extending slot 76 penetrating the wall of the sleeve 72.

The cylinder rod assembly 64 also includes a rod extension 80 generally similar in form to a cheese-head machine screw including a cylindrical head 82 with a cross drilled hole 84 and a substantially fully threaded shank 86 having a reduced diameter plain end 88 with an annular groove 90. A somewhat elongated nut 94 has a generally cylindrical body 96 with a fully screw-threaded central axial bore 98 and, at one end, a flange 100. Somewhat inset from the opposite end of the body 96 is an external annular groove 102 from the bottom of which a single chamferred hole 104 extends radially inwards. Between the flange 100 and the groove 102 the body 96 is enlarged into a short round-cornered square portion 106 offering four concentrically arranged flats or wrenching surfaces 108.

The combination safety stop-arm and wrench or handle assembly 110 includes a formed elongated generally channel shaped handle 112 having opposite walls 114 joined by a bottom or web 116. The handle 112 tapers gently to a square cut end or stop face 118. Close to this stop face 118, in the web 116, is a single retaining hole 120 and, spaced somewhat further from the end, in the sidewalls 114, a pair of opposite slots 122.

At the opposite end of the handle 112 the channel form is modified by removing a portion of the web and sidewalls to define a forklike configuration 124 (FIG. 3), the opposite prongs 126 of which each have a trunnion hole 128. A swivel assembly 130 is transversely and rotatably supported in the holes 128 and consists of a central wrench portion 132 with opposite outwardly extending trunnion pins 134 entering the holes 128. A round-cornered-square through axial bore 136 in the wrench portion 132 is somewhat larger than the round-cornered square portion 106 of the nut 94. A safety-stop retainer spring clip 138 is held captive in the handle 112 by opposite lobe portions 140 engaging the slots 122.

In considering assembly of the reel lift hydraulic cylinder assembly 50, it may be assumed that the cylinder rod assembly 64, and particularly the cylinder rod 66, are assembled to the cylinder body 56 in a conventional way. As for the rod assembly 64 itself, first the safety stop-arm and wrench-handle assembly 110 must be assembled to the nut 94 by inserting the nut through the hole 136 in the wrench portion 132 and positioning the wrench portion 132 at some convenient location between the flange 100 and the groove 102. Then the nut 94 is run onto the cylinder rod extension 80, at least far enough that the groove 90 is exposed so that a snap ring 142 can be installed in the groove. This sub-assembly may now be assembled into the cylinder rod sleeve 72 rigidly carried on the end of the rod proper 66 and in such a way that the nut 94 is held by the sleeve 72 against both rotational and axial relative movement. A commercially available means such as the resilient pull-in locking ring 144 shown in FIG. 3 may be used. The sub-assembly (including rod extension 80 and snap ring 142) is inserted in the sleeve 72 and positioned so that the hole 104 of the not 94 registers with the slot 76. The tang 146 at one end of the locking ring 144 is then engaged in the hole 104 and the nut 94 rotated relative to the sleeve 72, winding the ring into the annular space formed by the mating grooves 102, 74 until the trailing lobe 148 registers with and can snap inwards into the slot 76, thus effectively retaining the nut 94 in the sleeve 72.

The complete reel lift cylinder assembly 50 may now be installed on the gatherer as indicated in FIG. 1, inserting the pins 52 and 54 through the respective opposite ends of the cylinder assembly and the respective end sheet cylinder brackets 26 and reel arm brackets 46 respectively. The safety stop-arm and wrench-handle assembly 110 should then be oriented forward under the reel arm 42 and the latching chain 150 (secured to the reel arm) hooked into the hole 120 to retain the stop and wrench assembly in the field operating position indicated in FIG. 1.

The availability of fine adjustment as provided by a reel adjusting mechanism according to the invention is particularly useful in harvesting down or lodged crops when, to reduce losses, a pick-up reel is used and set as close to the cutterbar as possible. Any one of the choices of setting provided by the holes 28 in the lower reel lift cylinder bracket 26 may be undesirably far from a preferred setting but the precision desired in reel-tine to cutterbar clearance and maintenance of the reel parallel to the cutterbar are easily and conveniently achieved without the need wrenches or other tools. The adjustment provided does not change the length of effective stroke (output) of the reel lift cylinder but displaces it axially so that the upper and lower limits of reel positioning are changed.

To adjust the reel to the desired setting, the safety stop-arm and handle assembly 110 is released from its field operating or storage position, by unhooking the chain 150, and positioned so that the wrench portion 132 engages the flats 108 of the nut 94, in a first mode of engagement of the arm 110 with the cylinder 50. Using the handle 112 for leverage, the nut 94 may be turned in either direction to lengthen or shorten the cylinder rod assembly 64 as required, the cylinder rod 66 also turning because of the non-rotatable engagement of the nut 94 with the sleeve 72 caused by the pull-in locking ring 144. The cylinder rod extension 80 is, of course, held against rotation by the pin 54 and pivot bracket 46. In an alternative embodiment of the invention (not shown) the nut 94 may be free to turn relative to the cylinder rod 66 but axial retention of the nut is preferable, although not essential to the invention. Independent or differential adjustment of the cylinder rod assemblies at both ends of the harvester reel permit leveling of the reel (relative to the cutterbar) as well as setting it at the desired height above the cutterbar. Generally, this fine adjustment will be made with the reel lowered, that is with the cylinders 50 fully retracted and, subsequently, the operator can operate with confidence, lowering the reel to the minimum cutterbar clearance when needed, relying on the "stop" provided by the fully retracted condition of the cylinder to keep the reel tines out of the cutterbar.

For convenience, the nut 94 may be rotated in a series of, say, half turns or quarter turns rather than 360 degree swings by sliding the wrench portion 132 upwards off the wrenching flats portion 108 of the nut 94, into a "ratchet" position where the plain cylindrical portion of the nut body 96 permits the handle 112 to be retracted and retimed with respect to the nut 94. FIG. 4 shows the cylinder assembly 50 in its shortest setting—that is, with the cylinder rod extension 80 fully entered into the nut 94. Convenience is enhanced if the range of fine or supplementary adjustment provided is greater than the spacing between the holes 28 in the cylinder bracket 26.

It is an important safety feature that the snap ring 142 on the end of the cylinder rod extension 80 prevents the rod extension from being inadvertently screwed out of engagement with the nut 94 and, at least potentially, allowing the reel assembly 30 to fall under gravity.

When the desired adjustment setting of the reel has been made, the stop arm 112 is again secured in the field operating position using the chain 150 as shown in FIG. 1 and preferably with the wrench portion 132 engaging the flats 108 of the nut 94 so that the nut is prevented from turning relative to the rod extension 80 and changing the cylinder rod length adjustment inadvertently as the cylinder is extended and retracted during field operation.

Figure 5:
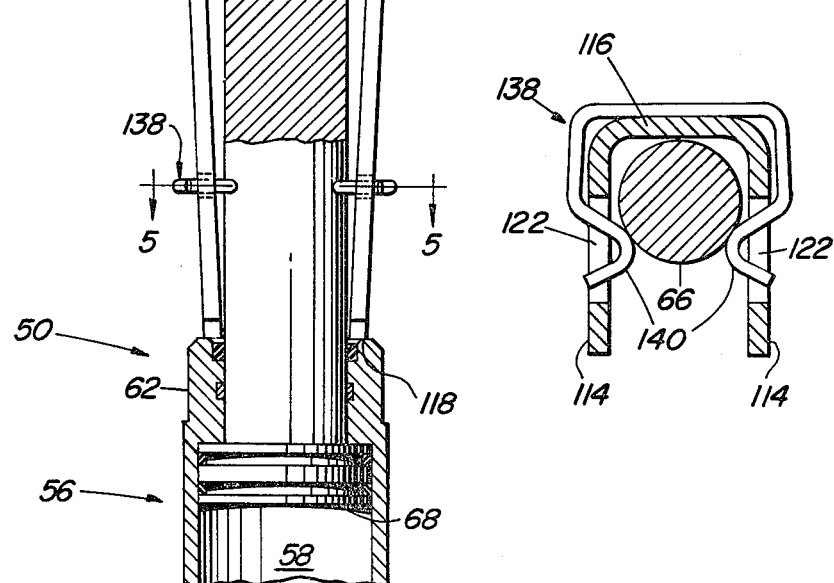
FIG. 5 is a cross-sectional view approximately on line 5—5 of FIG. 4 showing the spring clip arrangement for retaining the wrench-handle/stop-arm in general alignment with the cylinder rod assembly when used as a safety stop.

The second purpose of the arm 112, in a second mode of engagement of the arm assembly 110 with the cylinder 50, is to act as a safety stop to avoid inadvertent lowering of the reel 30 and possible injury to an operator or damage to parts, for example during adjustment or repair. With the cylinder fully extended, the stop arm 112 is swung into the "stop" position indicated in FIGS. 4 and 5 with the stop retainer clip 138 snapped over the cylinder rod 66 to retain the handle 112 in position so that any further retraction of the lift cylinder would bring the stop face 118 of the handle 112 against the end of the cylinder body 62 preventing further movement. In this condition, as indicated in FIG. 4, the upper surface of the wrench portion 132 bearing against the flange 100 of the nut 94 acts as a thrust face to transfer any downward force due to the reel through the stop handle 112 into the cylinder body 56. It will be appreciated that threaded adjustment of the rod extension 80 in or out of the nut 94 does not change the effective "stop" position of the stop arm 112 on the cylinder rod assembly 64 so that the cylinder is always fully extended when the stop arm 112 is acting as a safety device.

A harvester-reel embodiment of the invention has been described but it will be apparent that it is readily adaptable elsewhere—for example, as a modification of the header lift system (cylinders 16) to refine the control of height and lateral leveling of the cutting platform 10 as well as providing the safety stop function.

We claim:

1. In an agricultural machine having a mobile frame and a power source and carrying juxtaposed cooperating first and second material handling components, an improved means for controlling the spacing of the components to suit operating conditions comprising:

a linear actuator having an effective stroke and operably connected to the power source and having opposite first and second ends respectively engaging the first and second components adjacent a first location and extendable and retractable responsive to the power source to vary the spacing of the components at the first location within a first operating range established by the effective stroke of the actuator;

adjustment means integral with the actuator for changing the spacing of the ends of the actuator independently of the powered operation of the actuator so as to shift the operating range of the first component relative to the second; and means carried by the linear actuator shiftable between first and second modes of engagement with the actuator and operable to actuate the independent adjustment means when in the first mode and operable to limit retraction of the actuator when in the second mode.

2. The control means of claim 1 and further including a second linear actuator having an effective stroke and operably connected to the power source and having opposite first and second ends respectively engaging the first and second components adjacent a second location spaced from the first, and extendable and retractable responsive to the power source to vary the spacing of the components at the second location within a second operating range established by the effective stroke of the second actuator, the independent adjustment means of the first actuator being effective to differentially adjust the spatial disposition of the first operating range with respect to the second operating range.

3. In a harvester header including a frame carrying a cutting mechanism, and a reel disposed above the cutting mechanism and supported at its respective opposite ends by a pair of reel supports connected to the frame for relative vertical movement, a reel height adjusting mechanism comprising:
   a pair of hydraulic cylinder assemblies, one cylinder assembly being coupled between the frame and each of the reel supports and operable to extend and retract, moving the support so as to raise and lower the reel relative to the cutting mechanism, at least one cylinder including a body and a cylinder rod assembly having a piston end inserted in and telescopingly engaging the body and having an opposite free-end portion having an internally threaded bore and a cylinder rod extension having a threaded portion and engaging the threaded bore of the cylinder rod assembly and, at its opposite end, a pivot portion for pivotally engaging a reel support; and
   a stop arm normally carried by the rod assembly and selectively engageable with the rod assembly for rotating at least the free-end portion relative to the rod extension so as to adjust the length of the hydraulic cylinder assembly responsive to the threaded engagement and hence the height of the reel relative to the cutting mechanism for any given extension of the hydraulic cylinder.

4. The reel adjusting mechanism of claim 3 wherein the stop arm is axially displaceable relative to the rod assembly between a ratchet position in which it is freely rotatable on the rod assembly and a wrenching position in which it engages the rod assembly so that a force applied to the stop oblique to but displaced from the axis of the rod assembly applies a torque to the rod assembly for rotation of the free-end portion relative to the rod extension.

5. The reel adjusting mechanism of claim 3 wherein the stop arm is captively pivoted to the rod assembly at the free-end portion and is swingably movable between a storage position for harvesting operation and a stop position in which, when the hydraulic cylinder is extended, the stop arm is engageable with the cylinder body for limiting retraction movement of the hydraulic cylinder rod assembly relative to the body.

6. The reel adjusting mechanism of claim 5 wherein the stop arm is engageable with the cylinder body only when the cylinder is substantially fully extended.

7. The reel adjusting mechanism of claim 3 wherein the cylinder rod assembly includes a nut releasably connected to the free-end portion, said nut providing the internal threaded portion of the rod assembly, and means carried by the inner end of the rod extension for limiting axially outward threaded adjustment of the rod extension with respect to the nut so as to avoid inadvertent disengagement of the rod extension from the rod assembly.

8. A variable hydraulic cylinder for connecting between and controlling the relative positions of a pair of machine components comprising:
   an elongated cylinder body having an elongated axially extended open ended chamber and a pivot portion pivotably connectable to a first machine component;
   a cylinder rod having a piston end for inserting in and telescopingly engaging the body chamber and having an opposite free-end portion with an internally threaded bore;
   a cylinder rod extension having a threaded end portion for threadingly engaging the bore of the cylinder rod free-end portion and, at its opposite end, a pivot portion for pivotably engaging a second machine component; and
   a stop arm pivotably carried by the cylinder rod and selectively engageable with the rod free-end portion for rotating it relative to the rod extension so as to adjust the length of the hydraulic cylinder responsive to the threaded engagement and hence the axial spacing of the respective pivot portions of the cylinder body and the rod extension for any given extension of the hydraulic cylinder.

9. The hydraulic cylinder of claim 8 wherein the stop arm is pivoted to the rod adjacent the free-end portion and is swingably movable between a storage position permitting operation of the hydraulic cylinder for extension and retraction and a stop position in which, when the hydraulic cylinder is extended, the stop arm is engageable with the cylinder body for limiting retraction movement of the cylinder rod relative to the cylinder body.

* * * * *